United States Patent
Ji et al.

(10) Patent No.: US 9,503,978 B2
(45) Date of Patent: Nov. 22, 2016

(54) TIMING RESOLUTION FOR DEVICES WITH LONG SLEEP CYCLES

(71) Applicant: QUALCOMM Incorporated, San Diego, CA (US)

(72) Inventors: Tingfang Ji, San Diego, CA (US); Brian Clarke Banister, San Diego, CA (US); Peter Gaal, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 181 days.

(21) Appl. No.: 14/243,412

(22) Filed: Apr. 2, 2014

(65) Prior Publication Data

US 2014/0301263 A1 Oct. 9, 2014

Related U.S. Application Data

(60) Provisional application No. 61/808,019, filed on Apr. 3, 2013.

(51) Int. Cl.
*H04W 52/02* (2009.01)
*H04W 76/04* (2009.01)
*H04W 56/00* (2009.01)

(52) U.S. Cl.
CPC ..... *H04W 52/0216* (2013.01); *H04W 52/0212* (2013.01); *H04W 52/0229* (2013.01); *H04W 56/00* (2013.01); *H04W 76/048* (2013.01)

(58) Field of Classification Search
CPC ... H04W 52/04; H04W 52/00; H04W 52/02; H04W 76/04; H04W 76/048
USPC .......................... 370/311; 455/574
See application file for complete search history.

(56) References Cited

U.S. PATENT DOCUMENTS 6,029,061 A * 2/2000 Kohlschmidt ...... H04W 52/029
327/144
8,260,328 B1 9/2012 Yellin et al.
(Continued)

OTHER PUBLICATIONS

Ericsson., et al., "UE-supported DRX parameter settings", 3GPP Draft, R2-120435 UE Selected DRX Parameter Settings, 3rd Generation Partnership Project (3GPP), Mobile Competence Centre, 650, Route Des Lucioles, F-06921 Sophia-Antipolis Cedex, France, vol. RAN WG2, no. Dresden, Germany, 20120206-20120219, Jan. 31, 2012 (Jan. 31, 2012), XP050565392, pp. 1-3, [retrieved on Jan. 1, 2012].

(Continued)

*Primary Examiner* — Warner Wong
(74) *Attorney, Agent, or Firm* — Norton Rose Fulbright US LLP

(57) ABSTRACT

Timing resolution for user equipments (UEs) that operate using a discontinuous reception (DRX) mode that includes various sleep cycles may be addressed through selection of various alternative wake up procedures. A UE selects a wake-up procedure based on the length of the sleep cycle. The UE may use details of the sleep cycle, including a time offset or timing uncertainty associated with the sleep cycle, when selecting the wake-up procedure. The UE may select to obtain system timing information either directly from a serving cell or non-serving cell in sync with the serving cell or may select to perform either a one-step or two-step pre-wake up procedure in order to obtain the system timing. Once the UE obtains the system timing or determines a wake-up procedure, it performs timing correction before the scheduled wake-up times between the sleep cycles.

28 Claims, 8 Drawing Sheets

(56) References Cited

U.S. PATENT DOCUMENTS

| | | | | |
|---|---|---|---|---|
| 2006/0240798 | A1* | 10/2006 | Jarosinski | H04B 1/1615 455/343.1 |
| 2007/0037548 | A1* | 2/2007 | Sammour | H04W 52/0235 455/343.2 |
| 2008/0085680 | A1* | 4/2008 | Kim | H04W 76/048 455/69 |
| 2009/0186584 | A1* | 7/2009 | Lambrecht | H04W 52/241 455/67.11 |
| 2010/0070786 | A1* | 3/2010 | Qing | H04W 24/00 713/321 |
| 2010/0105449 | A1* | 4/2010 | Shi | H04W 52/0248 455/574 |
| 2010/0142485 | A1* | 6/2010 | Lee | H04W 36/02 370/331 |
| 2010/0202430 | A1* | 8/2010 | Chin | H04W 68/12 370/342 |
| 2010/0271176 | A1* | 10/2010 | Kim | H04W 52/0229 340/7.36 |
| 2011/0158303 | A1* | 6/2011 | Gauthier | H04W 52/0283 375/224 |
| 2011/0183726 | A1 | 7/2011 | Deng | |
| 2012/0030358 | A1 | 2/2012 | MacKenzie | |
| 2012/0100881 | A1* | 4/2012 | Son | H04W 52/0216 455/521 |
| 2014/0254451 | A1* | 9/2014 | Jamadagni | H04W 52/0216 370/311 |
| 2014/0293850 | A1* | 10/2014 | Huang | H04W 52/0225 370/311 |
| 2015/0173039 | A1* | 6/2015 | Rune | H04W 52/0216 370/311 |

OTHER PUBLICATIONS

International Search Report and Written Opinion—PCT/US2014/032785—ISA/EPO—Jul. 16, 2014.

LG Electronics: "Discussion on Coverage Enhancement for a low-cost MTC UE", 3GPP Draft, R1-124993 (MTC Coverage Enhancement LG), 3rd Generation Partnership Project (3GPP), Mobile Competence Centre, 650, Route Des Lucioles, F-06921 Sophia Antipolis Cedex, France, vol. RAN WG1, no. New Orleans, USA, 20121112-20121116 Nov. 3, 2012 (Nov. 3, 2012), XP050662908, pp. 1-5 Retrieved from the Internet: URL:http://www.3gpp.org/ftpftsgran/WG1RL1/TSGR171/Docs/[retrieved on Nov. 3, 2012].

* cited by examiner

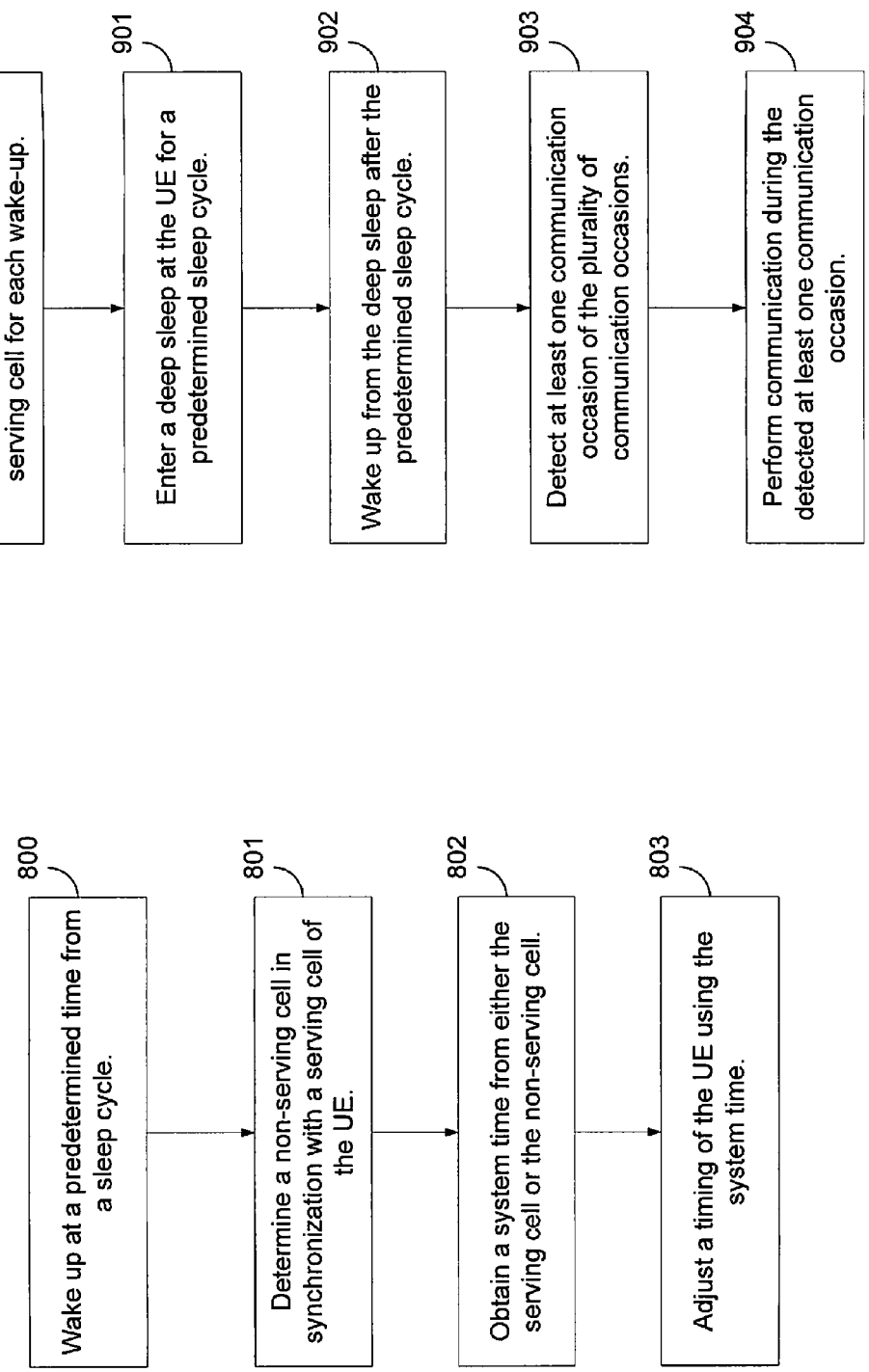

TIMING RESOLUTION FOR DEVICES WITH LONG SLEEP CYCLES

CROSS-REFERENCE TO RELATED APPLICATIONS

This application claims the benefit of U.S. Provisional Patent Application No. 61/808,019, entitled, "TIMING RESOLUTION FOR DEVICES WITH LONG SLEEP CYCLES", filed on Apr. 3, 2013, which is expressly incorporated by reference herein in its entirety.

BACKGROUND

1. Field

Aspects of the present disclosure relate generally to wireless communication systems, and more particularly, to timing resolution for devices with long sleep cycles.

2. Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes entering, by a UE, a sleep cycle in accordance with a configuration of the UE by a wireless network, selecting, by the UE, a wake-up procedure based on a length of the sleep cycle, and performing a cell detection, by the UE, in accordance with the selected wake-up procedure.

In one aspect of the disclosure, an apparatus configured for wireless communication includes means for entering, by a UE, a sleep cycle in accordance with a configuration of the UE by a wireless network, means for selecting, by the UE, a wake-up procedure based on a length of the sleep cycle, and means for performing a cell detection, by the UE, in accordance with the selected wake-up procedure.

In one aspect of the disclosure, a computer program product for wireless communications in a wireless network includes a non-transitory computer-readable medium having program code recorded thereon. The program code includes code to enter, by a UE, a sleep cycle in accordance with a configuration of the UE by a wireless network, code to select, by the UE, a wake-up procedure based on a length of the sleep cycle, and code to perform a cell detection, by the UE, in accordance with the selected wake-up procedure.

In an additional aspect of the disclosure, an apparatus configured for wireless communication includes at least one processor and a memory coupled to the processor. The processor is configured to wake-up, by a UE, at a predetermined time from a sleep cycle, to enter, by a UE, a sleep cycle in accordance with a configuration of the UE by a wireless network, to select, by the UE, a wake-up procedure based on a length of the sleep cycle, and to perform a cell detection, by the UE, in accordance with the selected wake-up procedure.

BRIEF DESCRIPTION OF THE DRAWINGS

FIGS. 8-11 are block diagrams illustrating example blocks executed to implement one aspect of the present disclosure.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
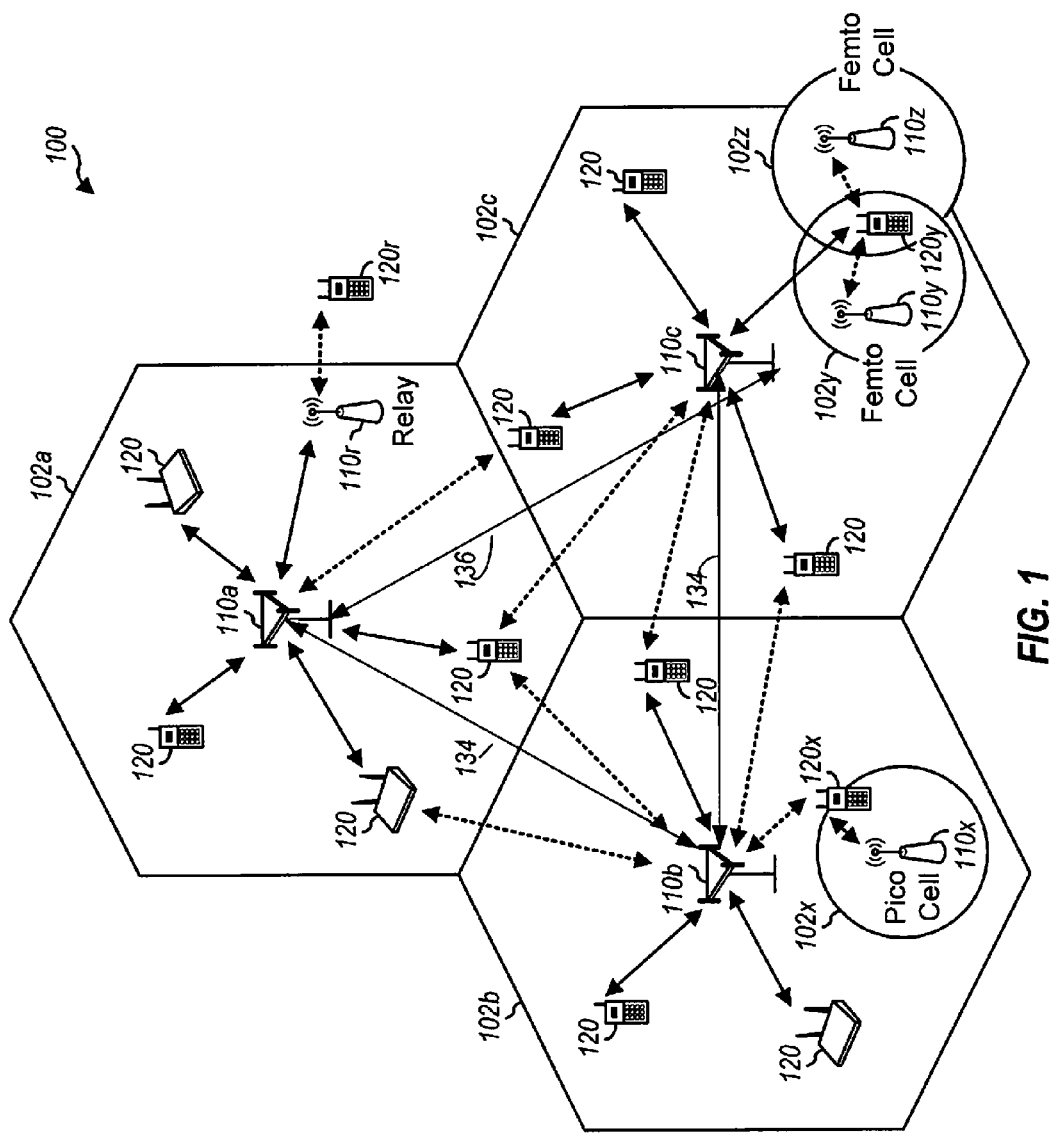
FIG. 1 is a block diagram illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
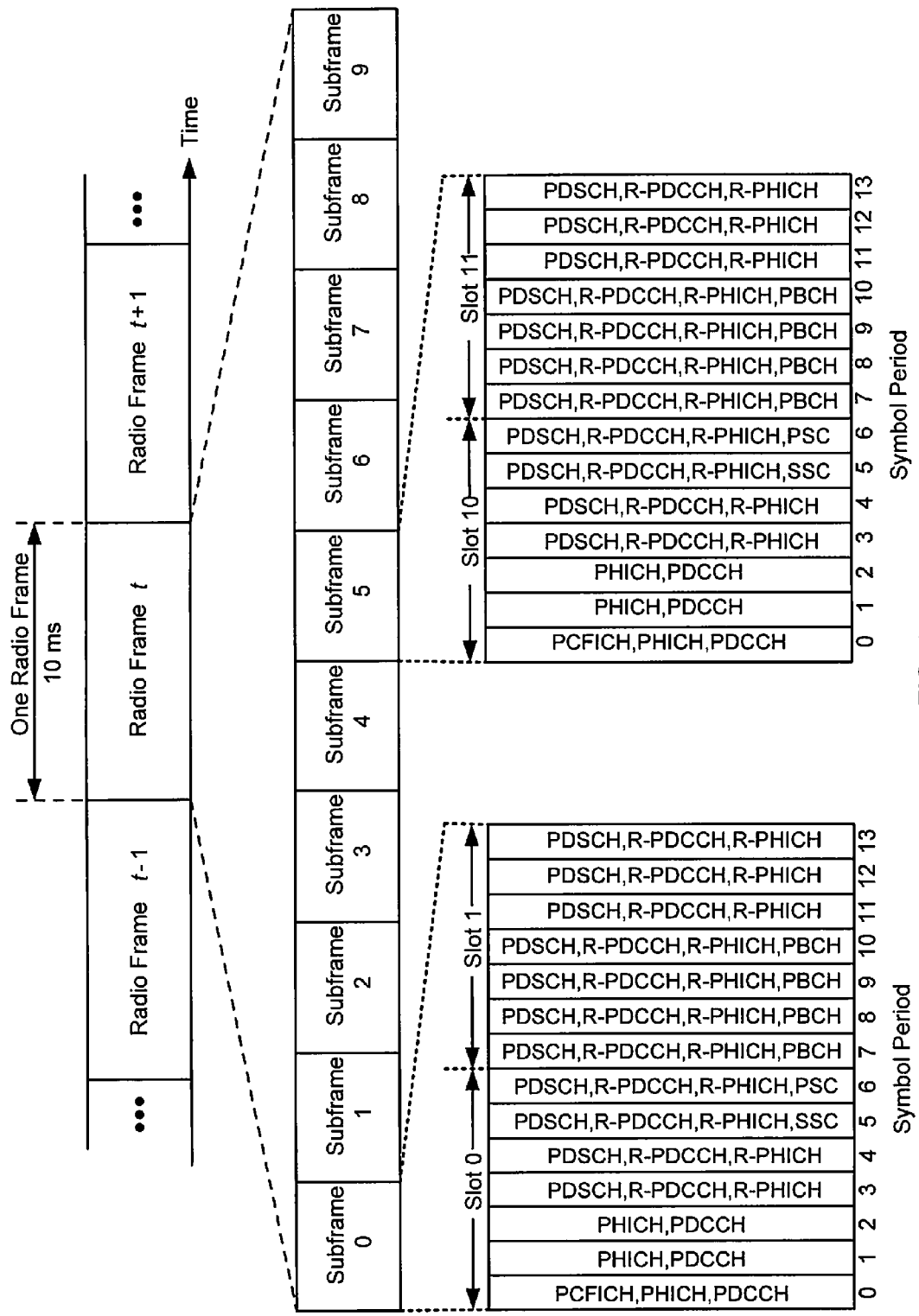
FIG. 2 is a block diagram illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, the LTE-A may also transmit these control-oriented channels in the data portions of each subframe as well. As shown in FIG. 2, these new control designs utilizing the data region, e.g., the Relay-Physical Downlink Control Channel (R-PDCCH) and Relay-Physical HARQ Indicator Channel (R-PHICH) are included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to, resource elements (REs) originally designated as the data region. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs. As discussed herein, system timing information, such as frame timing, subframe timing, physical cell identity, system frame number (SFN), etc. may be obtained based on the various signals.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
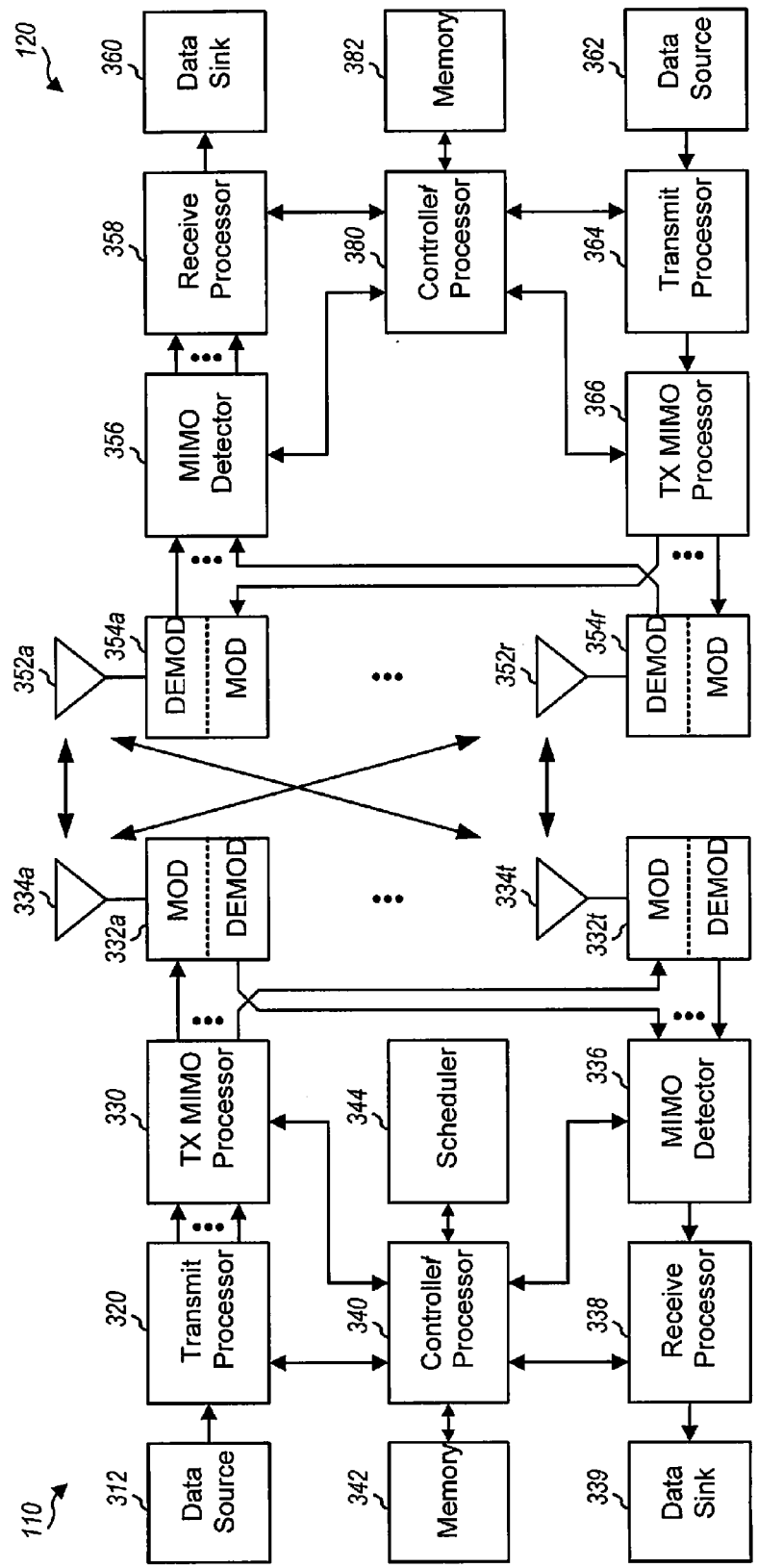
FIG. 3 is a block diagram illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 334a through 334t, and the UE 120 may be equipped with antennas 352a through 352r.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the eNB 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by the demodulators 354a through 354r (e.g., for SC-FDM, etc.), and transmitted to the eNB 110. At the eNB 110, the uplink signals from the UE 120 may be received by the antennas 334, processed by the modulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the eNB 110 and the UE 120, respectively. The controller/processor 340 and/or other processors and modules at the eNB 110 may perform or direct the execution of various processes for the techniques described herein. The controllers/processor 380 and/or other processors and modules at the UE 120 may also perform or direct the execution of the functional blocks illustrated in FIGS. 6 and 8-10, and/or other processes for the techniques described herein. The memories 342 and 382 may store data and program codes for the eNB 110 and the UE 120, respectively. A scheduler 344 may schedule UEs for data transmission on the downlink and/or uplink.

With the increase in availability and access to wireless networks, many machine-type devices are being configured to include wireless communication capabilities. These machines may include sensors, processing devices, machine interface units, and the like. UEs of such type are referred to as machine-type communication (MTC) devices. Because these devices typically perform an action and then transmit or receive reports or instructions, they are often implemented with a duty cycle that includes deep sleep cycles in the wireless communication components. Accordingly, the communications portion of MTC devices may remain in a deep sleep for long periods between transmitting data or listening for pages from a serving base station.

Based on the duty cycle of MTC traffic, MTC devices generally spend most of the time in a deep sleep mode. During the deep sleep mode, the MTC device completely shuts off the modem to reduce current and power usage. A coarse clock remains running to maintain timing for the next wake up. However, there are no measurements made, reports transmitted, nor page monitoring performed during deep sleep, which may last minutes, hours, or even longer.

A UE and eNB operate under separate timing mechanisms and, while the UE is in deep sleep mode, the coarse clock operates time tracking loops to maintain synchronization with the eNB. Variations in the crystal oscillator function or quality may cause for a slight drift in the timing between the UE and eNB. This variation is referred to as the "timing uncertainty." The frequency error, $\Delta$, in a UE is often a function of the quality or type of the crystal oscillator in the component circuitry, calibration procedures, and the use of compensation techniques. For example, a low-cost crystal oscillator may have a relatively high timing uncertainty due to a large frequency drift. In general, timing uncertainty may be specified as parts per million (ppm) in relation to the oscillation frequency may vary due to operating conditions. In some cases, timing uncertainty may be reduced using temperature compensation techniques. However, a trade-off remains in terms of component costs and timing accuracy, particularly while the device operates in deep sleep mode and attempts to conserve power. A low-cost/quality crystal may have a large error rate which may be reduced substantially after calibration and/or temperature compensation. This improved error rate of the low-cost/quality crystal may still be much larger than the error rate of higher quality crystals.

When a UE enters a sleep cycle, the timing uncertainty of the UE affects the total potential time drift of the UE or the amount of additional time that the UE will slowly become more out of sync with the eNB timing. Over a sleep time of T seconds, timing drift is represented as $\Delta T$ μs, or the frequency error $\Delta$ multiplied by the sleep time T. For example, a five second sleep cycle under may imply a $5\Delta$ μs timing uncertainly. With a 10 MHz crystal clock, the $5\Delta$ μs timing uncertainty corresponds to a potential 0.5 μs drift. However, with a coarse 30 KHz crystal clock, the same $5\Delta$ μs timing uncertainty corresponds to a potential drift of 50 μs or more, although this may be improved with temperature-compensated techniques.

Various aspects of the present disclosure provide for a UE that is scheduled for deep sleep cycles or longer sleep periods to wake up in advance of a scheduled communication in order to acquire system time to compensate for potentially large timing drift. In some such aspects, system time may be obtained from the serving cell, while in other aspects, the UE may obtain the system time from another cell in sync with the serving cell. For example, a macro eNB may provide timing information to the UE being served by a small cell, such as a femto or pico eNB, with non-full duty cycles.

In one aspect, a UE may utilize a one-step pre-wake up procedure in which the UE wakes up far enough in advance of the scheduled communication to obtain the system timing and adjust the UE's clock in time for the communication. Each UE maintains time tracking loops, which monitor system timing and adjust the UE's timing in order to remain synchronized with the serving cell. Time tracking loops have a certain operational timing range within which the UE timing may be out of sync with the serving cell timing but still be capable of tracking and synchronizing the two devices. This operational timing range is referred to as the pull-in range of the time tracking loop. As long as the timing offset between the UE and its serving cell remains within that pull-in range, the time tracking loop will be capable of synchronizing the two systems within a reasonable period of time. When the timing offset exceeds the pull-in range, the time tracking loop is not guaranteed to converge to a synchronized timing within a reasonable period of time, if at all.

The time tracking loop pull-in range may be used in various aspects of the present disclosure to assist in making a determination of which wake-up procedure to select. For example, if the timing uncertainty is <X/2, where X represents the pull-in range of the time tracking loop, the UE may be able to detect the system timing by directly accessing the common reference signal (CRS), as the UE may not be far out of sync with the serving cell. However, if the timing uncertainty is >X/2, the UE may not be able to access the CRS, but, instead, obtain a rough estimate of the system time from a detectable synchronization signal, such as the primary synchronization signal (PSS) or secondary synchronization signal (SSS). Where the timing uncertainty is much greater than X/2, the UE may be so far out of sync that it is in the wrong system frame number (SFN) and, therefore, could not only miss the CRS, but may miss a paging occasion completely because the UE is in the wrong radio frame. In such instances, where the timing uncertainty is >>X/2, the UE may then obtain the system timing by detecting and decoding the physical broadcast channel (PBCH) from the cell.

Figure 4:
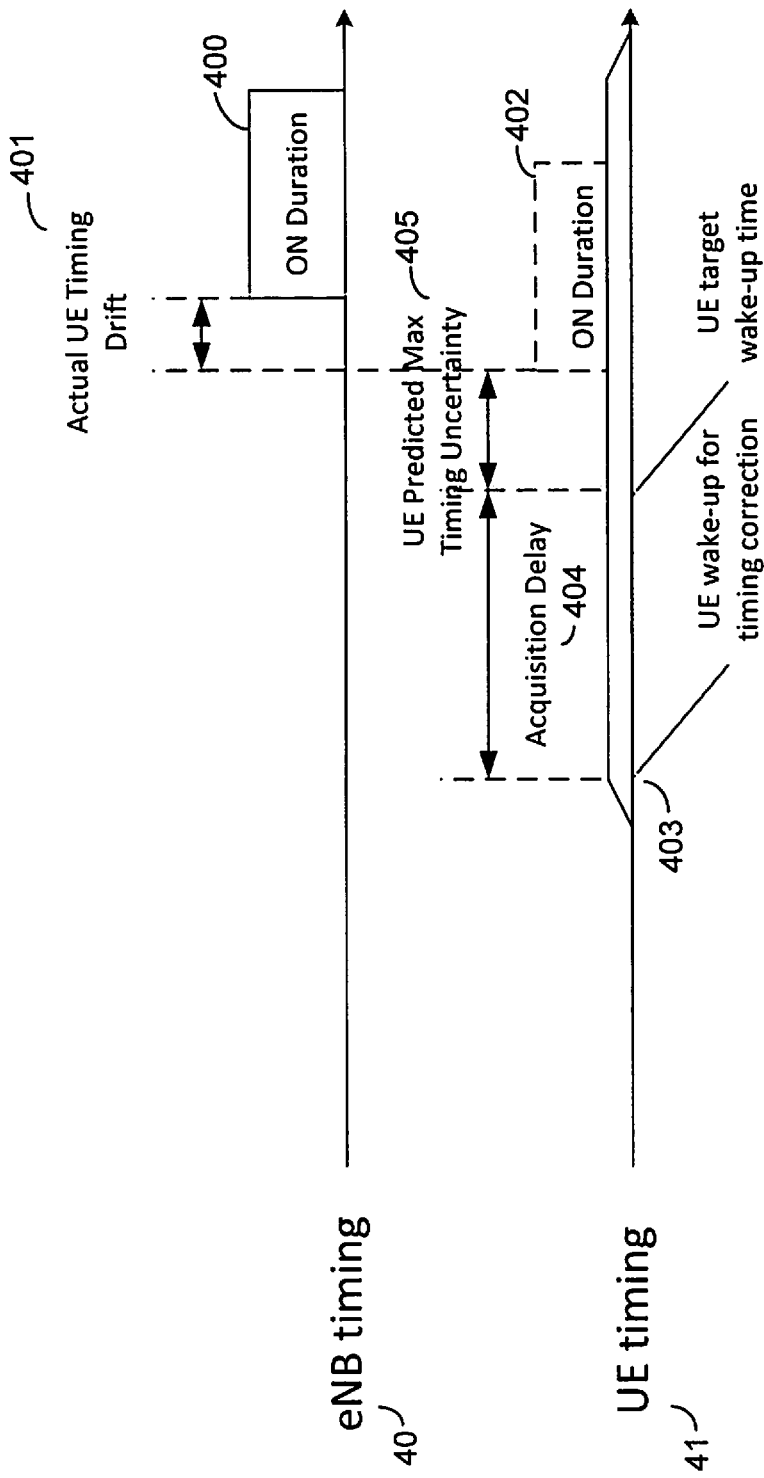
FIG. 4 is a timing diagram illustrating operational timing of a UE configured according to one aspect of the present disclosure.

FIG. 4 is a timing diagram illustrating operational timing of a UE configured according to one aspect of the present disclosure. The timing diagram illustrates eNB timing 40 and UE timing 41. As shown, the eNB is scheduled to transmit communications, such as pages or other information to the UE, or to receive uplink transmissions from the UE at 400. This communication includes a timing drift 401 attributable to the UE actual timing drift that occurs during the UE sleep time. The UE, which may be an MTC device, operates in a deep sleep cycle in which the device stays in a sleep mode and is scheduled to wake up to listen for pages from the serving eNB or to transmit certain signals or data. This scheduled communication (e.g., listening for pages or transmitting information) is shown at 402, and also includes a predicted maximum timing uncertainty 405. Predicted maximum timing uncertainty 405 may be determined as the sleep time multiplied by the frequency error of the UE. The UE's scheduled communication at 402 is supposed to be in sync with the scheduled communication from the eNB at 400. However, because each device or system has different timing mechanisms and componentry of varying quality, the two scheduled communication times may, in fact, be out of sync by a certain amount.

In order to ensure that the UE wakes up in time to synchronize its timing with the eNB for the scheduled communication at 402 to coincide with the scheduled communication of the eNB at 400, the UE selects a one-step pre-wake up procedure. According to this wake up procedure, the UE wakes up from its sleep mode at 403, which is at least equal to an acquisition delay 404 and the predicted maximum timing uncertainty 405 time before the scheduled communication at 402. During the acquisition delay 404, the UE may obtain the system timing, such as through a synchronization signal received or detected from the eNB (e.g., PSS/SSS). The UE may then use the system timing to adjust its time to the eNB system time. With the timing adjusted, the UE may accurately perform its scheduled communication at 402 to coincide with the scheduled communication from the eNB at 400.

A pre-wake up procedure will generally have a timing penalty associated with it, as the UE wakes up and expends power while operating well in advance of the actual scheduled communication. In a one-step wake up procedure, as described above, the timing penalty may be 2 $\Delta T + D_{acquisition}$ without considering component warm-up time, or 2 $\Delta T + D_{acquisition} + T_{warm-up}$ with the component warm-up time accounted for.

In additional aspects of the present disclosure, the UE may perform a two-step pre-wake up procedure in which the UE wakes twice prior to the scheduled communication. When the timing uncertainty is very large, a UE may benefit from sleeping between obtaining the system timing after the pre-wake up and the scheduled communication period. The UE wakes up at a first time that accommodates for the large timing uncertainty in order to obtain the system timing. The UE will adjust its own timing according to the acquired system timing and then re-enter the sleep mode. With the timing now adjusted and more in sync with the eNB, the UE may wake up again just prior to the scheduled communication period. In such a two-step pre-wake up procedure, the time penalty may be represented as 2 $\Delta' + D_{acquisition}$ without considering component warm-up time, or 2 $\Delta' + D_{acquisition} + T_{warm-up}$, with the component warm-up time accounted for, where $\Delta'$ is a modified timing drift that accounts for the two separate wake-ups and interim sleep period.

Figure 5:
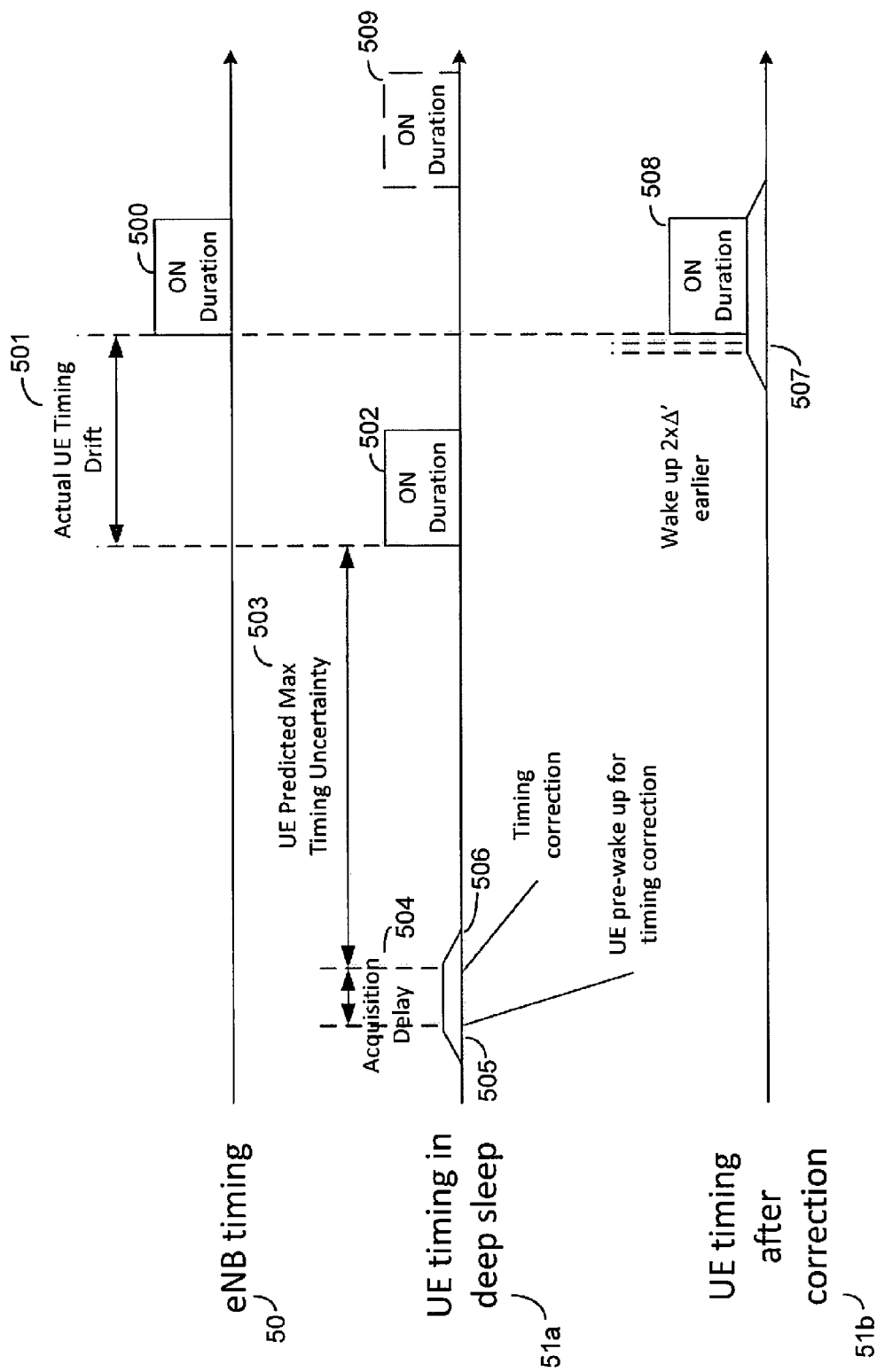
FIG. 5 is a timing diagram illustrating operational timing of a UE configured according to one aspect of the present disclosure.

FIG. 5 is a timing diagram illustrating operational timing of a UE configured according to one aspect of the present disclosure. The UE for which UE timing 51a and 51b are illustrated operates under a sleep cycle with long sleep durations. With the long sleep durations, the UE selects a two-step pre-wake up procedure configured according to one aspect of the present disclosure. The timing diagram illustrates eNB timing 50, and UE timing 51a, representing the timing of the UE while in the deep sleep, and UE timing 51b, representing the UE timing after the timing correction. The eNB has scheduled communication (e.g., pages, system signaling, etc.) at 500 which includes a timing drift 501 attributable to the actual timing drift that occurs while the UE is in the sleep mode. With the increased sleep cycle durations the timing of the UE may be far out of sync with the timing of the eNB. According to UE timing 51a, the uncorrected timing, the scheduled communication at 502 will not coincide with the timing of the eNB scheduled communication at 500 due to a large timing drift while the UE is in the sleep mode. With the selected two-step pre-wake up procedure, the UE wakes up at 505, which is at least an acquisition delay 504 plus predicted maximum timing uncertainty 503 from the scheduled communication of the uncorrected timing at 502.

During the acquisition delay 504, the UE obtains the system timing and performs the timing correction or adjustment to synchronize with the eNB timing. However, instead of remaining awake after the timing correction, the UE re-enters the sleep mode at 506. Because the UE is now in sync with the eNB again, the UE, in UE timing 51b, will schedule wake up again at 507, in time for its scheduled communication, scheduled at 508, which coincides with the scheduled communication from the eNB at 500. Because the sleep time after the first wake-up will be relatively brief before the scheduled communication at 500, there should be negligible or very little timing drift experienced by the UE. As such, the UE may only need to take into account warm-up time when scheduling to awake at 507 for its scheduled communication at 508. By re-entering sleep mode, the UE saves power while obtaining timing synchronization prior to the coordinated scheduled communications at 500 and 508.

It should be noted that, in an alternative example, a UE may experience a negative timing drift in which, upon waking from a deep sleep at 505, the UE timing has the scheduled communication at 509, which is behind the scheduled communication of the eNB at 500. However, this scheduled communication at 509 is still out of sync enough with eNB timing 50 such that the UE would miss the communication occasion at 500. Accordingly, when the UE wakes up at 505 and obtains the system timing, the UE will correct the timing in order to adjust the scheduled communication to occur at 508, which will be coordinated with the eNB scheduled communication at 500.

The time period attributable for signal acquisition or acquisition latency, $D_{acquisition}$, can be selected to represent a worst-case operating scenario. For example, in an LTE system, the worst-case operating scenario may involve a low signal geometry and a requirement that detection probably is greater than 90%. The acquisition latency may also include a fixed processing time that includes buffering and processing of one or more PSS/SSS instances. Time savings for an MTC UE may result from knowing the physical cell indicator (PCI), but processing time may still be added in order to find the PSS/SSS.

In scenarios with a larger timing uncertainty, in which the MTC UE may have lost sync of the SFN, the MTC UE may also attempt to decode the PBCH in order to obtain the system as well. For the PBCH, a one-shot decoding process at −4 dB geometry may be a reasonable processing assumption. In such a decoding process, there may only be an additional processing delay of a few ms, as there is a sample available at the first subframe, SF0. If more than one attempt is needed, however, tens of ms of samples may be needed for PBCH decoding.

The particular length of sleep cycle that may be associated with a discontinuous reception (DRX) mode may indicate whether the UE is able to obtain the system timing by accessing the CRS or by selecting a pre-wake up procedure that either obtains system timing through PSS/SSS or PBCH. The length of the sleep cycle will also affect timing uncertainty. Based on an estimate of the timing uncertainty, the UE may select an appropriate wake up procedure, whether by obtaining the system timing from either a serving cell or non-serving cell in synch with the serving cell, or performing either the one-step pre-wake up procedure or two-step pre-wake up procedure.

The sleep cycle lengths and related timing uncertainties may be used to calculate break points between the different procedures, which provide an indication of which procedure may be a better selection for the UE. The break points between the different procedures may be determined by calculating the longest DRX cycle that does not need pre-wake up and calculating the longest DRX cycle that does not need to re-acquire the SFN.

As one example, consider a UE with a time tracking loop having a pull-in range of 20 μs. This UE may be able to tolerate a timing drift of 10 μs. In a shorter sleep cycle, such as that when the UE may access the CRS, temperature compensation is effective, which yields a frequency error of approximately 1 ppm. Thus, according to a formula in which the sleep cycle T=the timing drift/the frequency error, the sleep cycle time becomes T=10 μs/1 ppm=10 s. Accordingly, considering a pull-in range of 20 μs, as long as a UE's DRX cycle does not exceed a 10 second sleep cycle, the UE may obtain system time by directly accessing the CRS. Thus, in this example, the UE may select a one-step wake up procedure when its sleep cycle has a duration of 10 seconds or less.

Continuing with the example, after a sleep cycle of 10 seconds, the longest DRX cycle that does not need to re-acquire SFN may be determined in a similar manner. The coarse timing information from PSS/SSS only offers a 10 ms timing resolution. Moreover, considering here a longer sleep cycle, temperature compensation does not alleviate or reduce the frequency error. Accordingly, the frequency error will be approximately 20 ppm. Thus, the sleep cycle T=10 ms/20 ppm=500 s=8 minutes. Accordingly, when the DRX mode of the UE has a sleep cycle between 10 s and 8 minutes, the UE may select a pre-wake up procedure that obtains coarse timing information from PSS/SSS. With a sleep cycle over 8 minutes, a pre-wake up procedure may be selected that obtains system timing by decoding PBCH.

Figure 6:
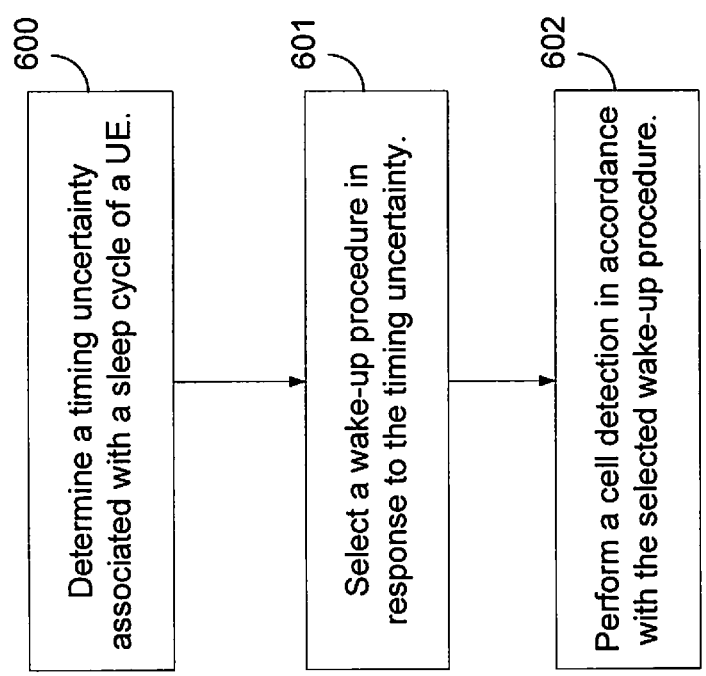
FIG. 6 is a block diagram illustrating example blocks executed to implement one aspect of the present disclosure.

FIG. 6 is a block diagram illustrating example blocks executed to implement one aspect of the present disclosure. At block 600, a UE determines a timing uncertainty associated with its sleep cycle. The timing uncertainty may be related both to the length of sleep cycle and a frequency error associated with the crystal oscillator, such as may be used for coarse timing while the UE sleeps. At block 601, The UE selects a wake-up procedure in response to the timing uncertainty. For example, the UE may select between obtaining the system timing directly from the serving cell or a non-serving cell in synch with the serving cell, may select to perform a one-step pre-wake up procedure, or may select to perform a two-step pre-wake up procedure. At block 602, the UE performs cell detection corresponding to the selected wake-up procedure. For example, if the timing uncertainty is greater than half of the pull-in range of the time tracking loop, the UE may select to perform the one-step pre-wake up procedure using detection of the PSS/SSS for obtaining the coarse system timing. If the timing uncertainty is much greater than half of the pull-in range, then the UE may select either the one-step pre-wake up procedure or the two-step pre-wake up procedure using the decoded PBCH to obtain the system time. If energy saving is a higher priority for the UE, it may select the two-step pre-wake up procedure over the one-step pre-wake up procedure.

Because each pre-wake up procedure involves waking up the UE well in advance of the scheduled communication, there is a power penalty associated with each such procedure. In a one-step pre-wake up procedure, the power penalty is determined according to the equation:

$$P_{Total}=2\Delta T+D_{acquisition} \qquad (1)$$

For one-step pre-wake up procedures with sleep cycles that are less than 8 minutes, temperature compensation operates to provide a frequency error of approximately 1 ppm ($\Delta \cong 1$ ppm). Assuming a sleep cycle of 1 minute (T=60 s), $P_{Total}=2\times 1\times 60$ μs+$D_{acquisition}$=0.12 ms+$D_{acquisition}$. $D_{acquisition}$ in a one-step pre-wake up procedure with a sleep cycle less than 8 minutes includes detection of PSS/SSS, which may be completed in a few tens of ms. Thus, depending on how long detection of PSS/SSS takes, the total power penalty, $P_{Total} \cong$ 15-25 ms.

For one-step pre-wake up procedures with sleep cycles greater than 8 minutes, temperature compensation does not work to reduce the frequency error. Thus, the approximate frequency error for the longer sleep cycles over 8 minutes may be approximately 20 ppm ($\Delta \cong 20$ ppm). Assuming a sleep cycle of 15 minutes (T=900 s), $P_{Total}=2\times 20\times 900$ μs+$D_{acquisition}$=36 ms+$D_{acquisition}$. With sleep cycles longer than 8 minutes, the acquisition time may include not only PSS/SSS detection, but also PBCH decoding. Thus, $D_{acquisition}$ may be completed in several tens of ms, a shorter duration for a favorable signal to noise ratio (SNR) (e.g., −4 dB) and a longer duration for a less favorable SNR (e.g., −10 dB).

The power penalty for a two-step pre-wake up procedure occurs with sleep cycles greater than 8 minutes (T>8 m). In a two-step pre-wake up procedure, the power penalty is determined according to the equation:

$$P_{Total}=2\Delta'+D_{acquisition} \qquad (2)$$

where Δ' represents the modified time drift for the two separate wake ups and is quantified by the error rate multiplied by the standard time drift, ΔT. According to the example conditions described above, Δ'≅1 ppm×(ΔT)≅0. Thus, the total power penalty for a two-step pre-wake up procedure would be $P_{Total}=0+D_{acquisition}$. As noted, with T>8 minutes, $D_{acquisition}$ for PSS/SSS/PBCH detection is several tens of ms.

It should be noted that this total power penalty, however, does not account for the additional hardware/software shut-down and warm-up times. In operation, an additional period of time associated with hardware/software shut-down and warm-up should be added to the total power penalty, e.g., $P_{Total}=2\ \Delta'+D_{acquisition}+D_{warm-up}$. For purposes of this example, a time of 20 ms may be considered for shut-down and warm-up, $D_{warm-up}$. The total power penalty, then becomes $P_{Operational}=20\ ms+D_{acquisition}$.

In consideration of each such wake up procedure, when the sleep cycle period T<10 s there may be no need for a pre-wake up, as the timing offset is likely within pull-in range of the time tracking loop. When the sleep cycle period T is greater than the timing uncertainty, 10 s<T<500 s, a one-step pre-wake up procedure may be selected that uses PSS/SSS to obtain the coarse system timing. In such pre-wake up procedures, the power penalty may be dominated by acquisition delay of a few tens of ms in detecting the PSS/SSS. When the sleep cycle period T is much greater than the timing uncertainty, T>500 s, no temperature compensation is available to reduce the frequency error, which results in larger error frequencies and larger timing errors, including potential radio frame confusion. Such scenarios will generally use PBCH acquisition and decoding in order to obtain the system time. In selecting between the one-step and two-step pre-wake up procedures, the two-step pre-wake up procedure may provide significant gain over the one-step procedure for sleep cycle periods T>500 s. The total power penalty will essentially comprise $D_{warm-up}+D_{acquisition}$, where $D_{warmup}$ may be from a few to tens of ms, accounting for additional hardware/software warm-up/shut-down cycles at lower current, and $D_{acquisition}$ may be tens of ms depending on the level of SNR. Comparatively, the total power penalty for the one-step procedure with T>500 s essentially comprises 2 $\Delta T+D_{acquisition}+D_{warm-up}$, where the 2 ΔT will result in a much higher time penalty because of the higher frequency error associated with the single-step procedure at the longer sleep cycle periods.

Figure 7:
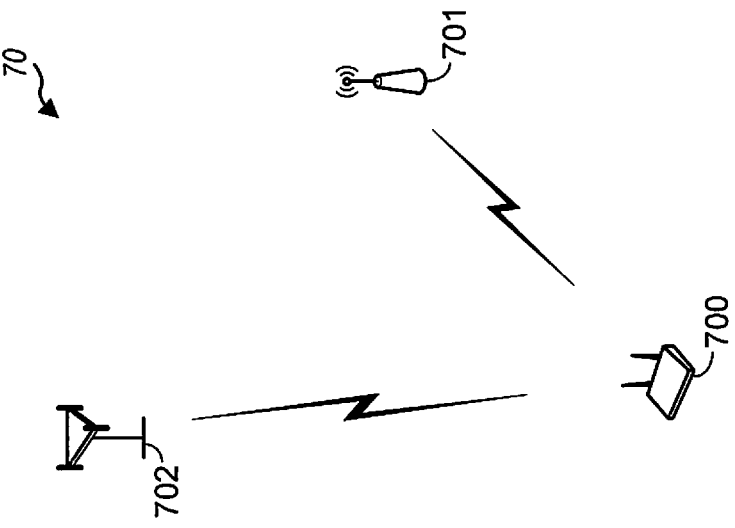
FIG. 7 is a block diagram illustrating a wireless communication network configured according to one aspect of the present disclosure.

FIG. 7 is a block diagram illustrating a wireless communication network 70 configured according to one aspect of the present disclosure. Within wireless communication network 70, MTC device 700 operates some functionality which may include measuring, monitoring, processing, and the like. Periodically, MTC device 700 communicates its information or receives information from associated systems through its serving cell, femto eNB 701. In order to save power, MTC device 700 operates in a DRX mode with long sleep cycles. In selected aspects of the present disclosure, when MTC device 700 wakes up from a sleep cycle, it may obtain system timing in order to perform timing correction based on the time drift that may have occurred during the sleep cycle. MTC device 700 may obtain this system timing either from femto eNB 701, which is its serving cell, or from macro eNB 702, which is a non-serving cell. However, MTC device 700 knows that femto eNB 701 is in sync with macro eNB 702. Thus, by obtaining the system timing from macro eNB 702, which may in some situations have a stronger signal or be transmitting more regularly than femto eNB 701, MTC device 700 can perform timing corrections to synchronize with femto eNB 701 and coordinate scheduled communications with femto eNB 701.

FIG. 8 is a block diagram illustrating example blocks executed to implement one aspect of the present disclosure. At block 800, a UE wakes up at a predetermined time from a sleep cycle. The UE may be any type of UE, such as a wireless smart phone, an MTC device, or the like. The UE operates under a DRX mode that includes various lengths of sleep cycles or deep sleep cycles. At block 801, the UE determines a non-serving cell in synchronization with a serving cell. For example, the UE may be served by a low-powered femto cell. This femto cell is known by the UE to be in synch with a macro cell in the area. At block 802, the UE obtains the system time from either the serving cell or the non-serving cell. For example, if the serving cell operates on a schedule in which it powers down occasionally or its signal is experiencing interference at the UE, the UE may determine to obtain the system timing information from the non-serving cell. In the case of the non-serving cell being a macro cell, the macro cell may be transmitting more frequently or have a stronger signal that the UE may more easily detect and obtain the system time. At block 803, the UE adjusts its timing using the system time. Because the serving cell and non-serving cell are known to be in sync, the UE adjusts or corrects its timing in order to be in synchronization with its serving cell. Scheduled communications between the UE and the serving cell may thereafter be synchronized until the next sleep cycle.

In communication operations with MTC devices that use either of the one-step or two-step pre-wake up procedures, the process for SFN confusion and timing acquisition could potentially take tens of ms plus additional warm-up and shut-down time. However, an optimized MTC DRX on duration could be on the order of only a few ms. As such, the overhead in maintaining these pre-wake up procedures may be much greater than the payload being delivered by the MTC device. Accordingly, instead of allocating pre-defined wake-up times for uplink and downlink access for such UEs, various aspects of the present disclosure configure a set of opportunities for uplink and downlink access, such that a UE may access the system without knowing the precise timing.

FIG. 9 is a block diagram illustrating example blocks executed to implement one aspect of the present disclosure. At block 900, a UE receives allocation of multiple communication occasions from a serving cell for each wake-up. Thus, instead of single, preset communication occasions for uplink and downlink communications, the UE is allocated a set of multiple such communication occasions. At block 901, the UE enters a deep sleep for a predetermined sleep cycle. The UE may be a wireless smart phone, an MTC device, or the like, that is configured for a DRX mode with deep sleep cycles. At block 902, the UE wakes up from the deep sleep after the predetermined sleep cycle and, at block 903, detects at least one communication occasion of the allocated number of communication occasions. For example, after the scheduled deep sleep period, the UE wakes and searches for one of the communication occasions that it has been allocated. Because a number of such communication occasions have been allocated, the UE may detect at least one. At block 904, the UE performs a scheduled communication during the detected communication occasion. The UE is scheduled to wake periodically from its deep sleep cycles in order to perform some kind of scheduled communication, such as listening for pages from the eNB or transmitting information or other signals to the eNB. Once one of the multiple communication occasion is detected, whether an uplink or downlink occasion, the UE may perform its scheduled communication (listening for pages—downlink; or transmitting signals—uplink).

For example, instead of persistent assignment for uplink communications, a UE may be assigned multiple subframes within a certain timing uncertainty for uplink access. Within this period, a UE could access the system on certain resources, e.g., subframes 1 and 5 for radio frames with SFN number between some determined range, [m, n], may be allocated for MTC access over certain allocated RBs. This range of subframes, [m,n], may be associated with the timing uncertainty of the UE. Such that, for example, if the timing uncertainty is on the order of 30 ms, then absolute value of the range of subframes [m,n] should be greater than 30 ms.

In allocating resources for uplink traffic, dedicated access may be used for high reliability traffic, while shared access may be used for low reliability traffic. It should be noted that in a shared access configuration various resource sharing schemes may be used for coordinating access to the resources, including CDMA, ALOHA, and the like.

In the downlink context, instead of allocating only a single paging occasion for a UE, the UE may be paged on multiple occasions taking into account the UE timing error. The UE timing error is assumed to be an SFN confusion. Therefore, a page may be carried out over multiple radio frames.

Much of the timing resolution overhead is linked to the frequency of PSS/SSS/PBCH occurrences. In order to enable MTC devices to obtain system timing more quickly, MTC synchronization signals could be defined with shorter periodicity in additional aspects of the present disclosure. The shorter periodicity may be implemented simply by decreasing the time between each PSS/SSS/PBCH transmission or by duplicating PSS/SSS/PBCH signals in more subframes.

Figure 10:
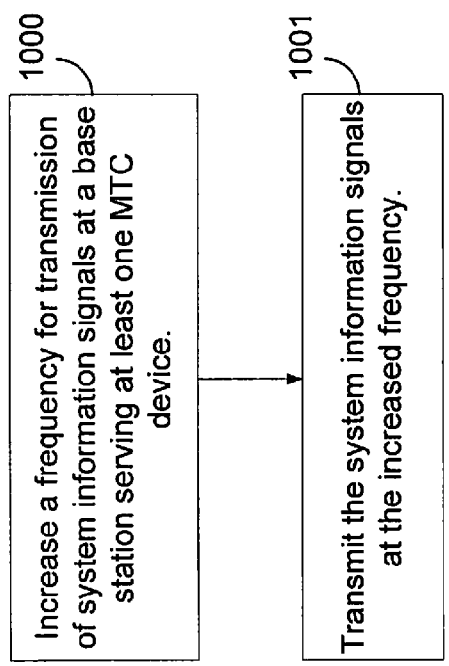

FIG. 10 is a block diagram illustrating example blocks executed to implement one aspect of the present disclosure. At block 1000, a base station serving at least one MTC device increases a frequency for transmission of system information signals. The increase in frequency may be implemented either by reducing the time between transmissions of such system information signals, such as PSS, SSS, and PBCH signaling or by repeating or duplicating the system information signals in more subframes. At block 1001, the serving base station transmits the system information signals at the increased frequency.

Figure 11:
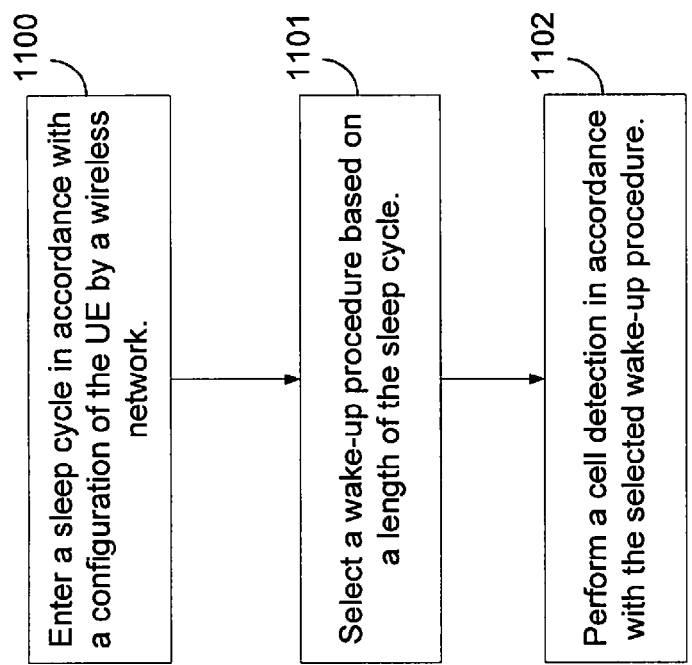

FIG. 11 is a block diagram illustrating example blocks executed to implement one aspect of the present disclosure. At block 1100, a UE enters a sleep cycle in accordance with a configuration of the UE by the wireless network. The UE may be a wireless smart phone, an MTC device, or the like, that is configured for a DRX mode with deep sleep cycles. The deep sleep cycles allow for the UE to save power when transmitting or receiving data occurs only sporadically or intermittently.

At block 1101, the UE selects a pre-wake up procedure based on a length of the sleep cycle of the UE. When the DRX mode of the UE has a sleep cycle between 10 s and 8 minutes, the UE may select a pre-wake up procedure that obtains coarse timing information from PSS/SSS. With a sleep cycle over 8 minutes, a pre-wake up procedure may be selected that obtains system timing by decoding PBCH. For example, the UE may select a one-step wake up procedure or a two-step pre-wake up procedure for sleep cycles between 10 s and 8 minutes or over. As noted above, if energy saving is a higher priority for the UE, it may select the two-step pre-wake up procedure over the one-step pre-wake up procedure. At block 1102, the UE performs a cell detection in accordance with the selected wake-up procedure.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 6 and 8-10 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. A computer-readable storage medium may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, non-transitory connections may properly be included within the definition of computer-readable medium. For example, if the instructions are transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    entering, by a user equipment (UE), a sleep cycle in accordance with a configuration of the UE by a wireless network;
    selecting, by the UE, a wake-up procedure based on a length of the sleep cycle, wherein the selected wake-up procedure comprises:
        waking prior to expiration of the sleep cycle; and
        acquiring system timing information based on a common reference signal when the length of the sleep cycle is less than a threshold value; and
    performing a cell detection, by the UE, in accordance with the selected wake-up procedure.

2. The method of claim 1, wherein the selected wake-up procedure further comprises:
    waking prior to expiration of the sleep cycle; and
    acquiring the system timing information based further on a synchronization signal when the length of the sleep cycle is greater than the threshold value.

3. The method of claim 1, wherein the threshold value is based at least in part on a time tracking capability of the UE while in sleep mode.

4. The method of claim 1, wherein the threshold value is based further on availability at the UE of temperature compensation for time tracking.

5. The method of claim 1, wherein the selected wake-up procedure comprises:
    obtaining the system timing information from one of: a serving cell and a non-serving cell in synchronization with the serving cell of the UE.

6. The method of claim 5, wherein the system timing information is obtained from network signaling, wherein network signaling comprises one of:
    a common reference signal (CRS);
    a primary synchronization signal (PSS);
    a secondary synchronization signal (SSS); or
    a physical broadcast channel (PBCH).

7. A method of wireless communication, comprising:
    entering, by a user equipment (UE), a sleep cycle in accordance with a configuration of the UE;
    selecting, by the UE, one of a one-step wake-up procedure or a two-step wake-up procedure based on a length of the sleep cycle, including selecting the one-step wake-up procedure when the sleep cycle is less than or equal to a threshold time or a timing uncertainty associated with the sleep cycle is greater than a pull-in range of a time tracking loop of the UE, wherein the one-step wake-up procedure and the two-step wake-up procedure each include waking from the sleep cycle prior to a scheduled wake-up time and obtaining system timing information, and wherein the two-step wake-up procedure further comprises:
        adjusting a timing of the UE using the system timing information;
        re-entering a sleep mode after the adjusting; and
        waking from the sleep mode at a second time prior to the scheduled wake-up time; and
    performing a cell detection, by the UE, in accordance with the selected wake-up procedure.

8. An apparatus configured for wireless communication, comprising:
    means for entering, by a user equipment (UE), a sleep cycle in accordance with a configuration of the UE by a wireless network;
    means for selecting, by the UE, a wake-up procedure based on a length of the sleep cycle, wherein the selected wake-up procedure comprises:
        means for waking prior to expiration of the sleep cycle; and
        means for acquiring system timing information based on a common reference signal when the length of the sleep cycle is less than a threshold value; and
    means for performing a cell detection, by the UE, in accordance with the selected wake-up procedure.

9. The apparatus of claim 8, wherein the selected wake-up procedure comprises:
    means for waking prior to expiration of the sleep cycle; and
    means for acquiring the system timing information based further on a synchronization signal when the length of the sleep cycle is greater than the threshold value.

10. The apparatus of claim 8, wherein the threshold value is based at least in part on a time tracking capability of the UE while in sleep mode.

11. The apparatus of claim 8, wherein the threshold value is based further on availability at the UE of temperature compensation for time tracking.

12. The apparatus of claim 8 wherein the wake-up procedure includes one of:
    a one-step wake-up procedure, comprising:
        means for waking up from the sleep cycle prior to a scheduled wake-up time; and a two-step wake-up procedure, comprising:
  means for waking up from the sleep cycle prior to the scheduled wake-up time;
  means for adjusting a timing of the UE using the system timing information;
  means for re-entering a sleep mode after the adjusting; and
  means for waking up from the sleep mode at a second time prior to the scheduled wake-up time.

13. A computer program product for wireless communications in a wireless network, comprising:
  a non-transitory computer-readable medium having program code recorded thereon, the program code including:
    program code for causing a computer to enter, by a user equipment (UE), a sleep cycle in accordance with a configuration of the UE by a wireless network;
    program code for causing the computer to select, by the UE, a wake-up procedure based on a length of the sleep cycle, wherein the selected wake-up procedure comprises:
      program code for causing the computer to wake prior to expiration of the sleep cycle; and
      program code to acquire system timing information based on a common reference signal when the length of the sleep cycle is less than a threshold value; and
    program code for causing the computer to perform a cell detection, by the UE, in accordance with the selected wake-up procedure.

14. The computer program product of claim 13, wherein the selected wake-up procedure comprises:
  program code for causing the computer to wake prior to expiration of the sleep cycle; and
  program code to acquire the system timing information based further on a synchronization signal when the length of the sleep cycle is greater than the threshold value.

15. The computer program product of claim 13, wherein the threshold value is based at least in part on a time tracking capability of the UE while in sleep mode.

16. The computer program product of claim 13, wherein the threshold value is based further on availability at the UE of temperature compensation for time tracking.

17. The computer program product of claim 13, wherein the wake-up procedure comprises:
  program code for causing the computer to obtain the system timing information from one of: a serving cell and a non-serving cell in synchronization with the serving cell of the UE, wherein the system timing information is obtained from network signaling, wherein network signaling comprises one of:
  a common reference signal (CRS);
  a primary synchronization signal (PSS);
  a secondary synchronization signal (SSS); or
  a physical broadcast channel (PBCH).

18. The computer program product of claim 17, wherein the wake-up procedure includes one of:
  a one-step wake-up procedure, comprising:
    program code for causing the computer to wake up from the sleep cycle prior to a scheduled wake-up time; and
  a two-step wake-up procedure, comprising:
    program code for causing the computer to wake up from the sleep cycle prior to the scheduled wake-up time;
    program code for causing the computer to adjust a timing of the UE using the system timing information;
    program code for causing the computer to re-enter a sleep mode after the program code for causing the computer to adjust; and
    program code for causing the computer to wake up from the sleep mode at a second time prior to the scheduled wake-up time.

19. An apparatus configured for wireless communication, the apparatus comprising:
  at least one processor; and
  a memory coupled to the at least one processor,
    wherein the at least one processor is configured to cause the apparatus:
      to enter a sleep cycle in accordance with a configuration of the apparatus;
      to select a wake-up procedure based on a length of the sleep cycle, wherein the selected wake-up procedure comprises:
        waking by the apparatus prior to expiration of the sleep cycle; and
        acquiring system timing information by the apparatus based on a common reference signal when the length of the sleep cycle is less than a threshold value; and
      performing a cell detection, by the apparatus, in accordance with the selected wake-up procedure.

20. The apparatus of claim 19, wherein the selected wake-up procedure further comprises:
  waking by the apparatus prior to expiration of the sleep cycle; and
  acquiring the system timing information by the apparatus based further on a synchronization signal when the length of the sleep cycle is greater than the threshold value.

21. The apparatus of claim 19, wherein the threshold is based at least in part on one or more of:
  a time tracking capability of the apparatus while in sleep mode; and
  availability at the apparatus of temperature compensation for time tracking.

22. The method of claim 7, wherein the one-step wake-up procedure obtains the system timing information based on a common reference signal (CRS), and the two-step wake-up procedure obtains the system timing information based on: a primary synchronization signal (PSS); a secondary synchronization signal (SSS); a physical broadcast channel (PBCH); or combinations thereof.

23. A user equipment (UE) configured for wireless communication, comprising:
  means for entering, by the user equipment (UE), a sleep cycle in accordance with a configuration of the UE by a wireless network;
  means for selecting, by the UE, one of a one-step wake-up procedure or a two-step wake-up procedure based on a length of the sleep cycle, including means for selecting the one-step wake-up procedure when the sleep cycle is less than or equal to a threshold time or a timing uncertainty associated with the sleep cycle is greater than a pull-in range of a time tracking loop of the UE, wherein the one-step wake-up procedure and the two-step wake-up procedure each include waking from the sleep cycle prior to a scheduled wake-up time and obtaining system timing information, and wherein the two-step wake-up procedure further comprises:

adjusting a timing of the UE using the system timing information;

re-entering a sleep mode after the adjusting; and waking from the sleep mode at a second time prior to the scheduled wake-up time; and means for performing a cell detection, by the UE, in accordance with the selected wake-up procedure.

24. The user equipment of claim 23, wherein the one-step wake-up procedure obtains the system timing information from a common reference signal (CRS), and the two-step wake-up procedure obtains the system timing information from one of: a primary synchronization signal (PSS); a secondary synchronization signal (SSS); a physical broadcast channel (PBCH); or combinations thereof.

25. A computer program product for wireless communications in a wireless network, comprising:

a non-transitory computer-readable medium having program code recorded thereon, the program code including:

program code for entering, by a user equipment (UE), a sleep cycle in accordance with a configuration of the UE;

program code for selecting, by the UE, one of a one-step wake-up procedure or a two-step wake-up procedure based on a length of the sleep cycle, including means for selecting the one-step wake-up procedure when the sleep cycle is less than or equal to a threshold time or a timing uncertainty associated with the sleep cycle is greater than a pull-in range of a time tracking loop of the UE, wherein the one-step wake-up procedure and the two-step wake-up procedure each include waking from the sleep cycle prior to a scheduled wake-up time and obtaining system timing information, and wherein the two-step wake-up procedure further comprises:

program code for adjusting a timing of the UE using the system timing information;

program code for re-entering a sleep mode after the adjusting; and program code for waking from the sleep mode at a second time prior to the scheduled wake-up time; and program code for performing a cell detection, by the UE, in accordance with the selected wake-up procedure.

26. The computer program product of claim 25, wherein the one-step wake-up procedure obtains the system timing information based on a common reference signal (CRS), and the two-step wake-up procedure obtains the system timing information based on: a primary synchronization signal (PSS); a secondary synchronization signal (SSS); a physical broadcast channel (PBCH); or combinations thereof.

27. A user equipment (UE) configured for wireless communication, the UE comprising:

at least one processor; and a memory coupled to the at least one processor, wherein the at least one processor is configured:

to enter, by the UE, a sleep cycle in accordance with a configuration of the UE by a wireless network;

to select, by the UE, one of a one-step wake-up procedure or a two-step wake-up procedure based on a length of the sleep cycle, including means for selecting the one-step wake-up procedure when the sleep cycle is less than or equal to a threshold time or a timing uncertainty associated with the sleep cycle is greater than a pull-in range of a time tracking loop of the UE, wherein the one-step wake-up procedure and the two-step wake-up procedure each include waking from the sleep cycle prior to a scheduled wake-up time and obtaining system timing information, and wherein the two-step wake-up procedure further comprises:

adjusting a timing of the UE using the system timing information;

re-entering a sleep mode after the adjusting; and waking from the sleep mode at a second time prior to the scheduled wake-up time; and to perform a cell detection, by the UE, in accordance with the selected wake-up procedure.

28. The user equipment of claim 27, wherein the one-step wake-up procedure obtains the system timing information based on a common reference signal (CRS), and the two-step wake-up procedure obtains the system timing information based on: a primary synchronization signal (PSS); a secondary synchronization signal (SSS); a physical broadcast channel (PBCH); or combinations thereof.

* * * * *